United States Patent
Ashcroft et al.

(10) Patent No.: US 6,460,144 B1
(45) Date of Patent: Oct. 1, 2002

(54) RESILIENCE IN A MULTI-COMPUTER SYSTEM

(75) Inventors: Derek William Ashcroft, Altrincham (GB); Geoffrey Robert Atkinson, Ouston (GB); Philip McKirgan, East Bierley (GB); Stephen Paul Tickhill, Alford (GB)

(73) Assignee: International Computers Limited, London (GB)

( * ) Notice: Subject to any disclaimer, the term of this patent is extended or adjusted under 35 U.S.C. 154(b) by 0 days.

(21) Appl. No.: 09/385,937

(22) Filed: Aug. 30, 1999

(30) Foreign Application Priority Data

| Sep. 8, 1998 | (GB) | ................................................ 9819523 |
| Sep. 9, 1998 | (GB) | ................................................ 9819524 |
| Jan. 12, 1999 | (GB) | ................................................ 9900473 |

(51) Int. Cl.⁷ ................................................ G06F 11/00
(52) U.S. Cl. ........................................................ 714/4
(58) Field of Search .............................. 714/4, 5, 6, 10, 714/11, 12, 13, 25, 42, 43, 47, 2, 3, 56

(56) References Cited

U.S. PATENT DOCUMENTS

| 4,371,754 | A | * | 2/1983 | De et al. ................. 179/18 EE |
| 4,466,098 | A | * | 8/1984 | Southard ........................ 371/9 |
| 5,155,729 | A | * | 10/1992 | Rysko et al. .................. 371/9.1 |
| 5,278,969 | A | * | 1/1994 | Pashan et al. ............... 395/425 |
| 5,408,649 | A | * | 4/1995 | Beshears et al. ............ 395/575 |
| 5,600,808 | A | * | 2/1997 | Kasukawa ................... 395/672 |
| 5,621,884 | A | * | 4/1997 | Beshears et al. ........ 395/182.08 |
| 5,870,537 | A | * | 2/1999 | Kern et al. ............. 395/162.04 |
| 5,974,114 | A | * | 10/1999 | Blum et al. ..................... 379/9 |
| 6,167,531 | A | * | 12/2000 | Silwinski ..................... 714/13 |
| 6,205,557 | B1 | * | 3/2001 | Chong et al. ................... 714/4 |

OTHER PUBLICATIONS

Kramer, "Fault–Tolerant LANs Guard Against Malfunction, Data Loss", PC Week, vol. 4, No. 37, Sep. 15, 1987, pp. C26–30.

* cited by examiner

Primary Examiner—Nadeem Iqbal
(74) Attorney, Agent, or Firm—Lee, Mann, Smith, McWilliams, Sweeney & Ohlson

(57) ABSTRACT

A multi-node computer system is described which includes a number of active nodes and a standby node. Each node hosts a server installation. Each server has a system disk, and a recovery disk, which holds a synchronised recovery copy of data held on the system disk. In the event of failure of a node, a recovery process is run to reconfigure the system, by connecting the recovery disk corresponding to the failed computer to the system disk of the standby computer, and copying the contents of this recovery disk to the system disk. This causes the server in the failed node to migrate to the standby node, which thus becomes an active node.

8 Claims, 3 Drawing Sheets

RESILIENCE IN A MULTI-COMPUTER SYSTEM

BACKGROUND TO THE INVENTION

This invention relates to techniques for achieving resilience in a multi-computer system.

Such systems are often used to support a large number of users, and to store very large databases. For example, a typical system may consist of 8 server computers, supporting up to 50,000 users and may store one or more 300 GigaByte databases.

It would be desirable to be able to provide such a system based on standard server software such as for example Microsoft Exchange running under Microsoft Windows NT. However, a problem with this is that of providing resilience to failure of one of the computers. The use of cluster technology for a system of this scale would be too expensive. Also, Microsoft Exchange is not a cluster-aware application, and it is not permissible to have two instances of Exchange on the same server (even a 2-node cluster).

SUMMARY OF THE INVENTION

According to the invention, there is provided a method of operating a computer system comprising a plurality of computers, a plurality of system disk units, one for each of said computers, and a plurality of further disk units, one for each of said computers, the method comprising:

(a) designating a plurality of said computers as active computers and designating another of said computers as a standby computer;

(b) using the further disk units to provide a synchronised recovery copy of data held on the system disk units, and (c) reconfiguring the system in the event of failure of one of the active computers, by causing the standby computer to pick up the further disk unit corresponding to the failed computer.

DESCRIPTION OF AN EMBODIMENT OF THE INVENTION

One computer system in accordance with the invention will now be described by way of example with reference to the accompanying drawings.

In the present specification, the following terms are used with specific meanings:

Node: this means an individual computer hardware configuration. In the present embodiment of the invention, each node comprises an ICL Xtraserver computer. Each node has a unique identity number.

Server: this means a specific server software installation. In the present embodiment of the invention, each server comprises a specific Microsoft NT installation. Each server has a unique server name, and is capable of being hosted (i.e. run) on any of the nodes. A server can, if necessary, be shut down and relocated to another node.

System: this means a number of servers accessing a common storage unit.

Figure 1:
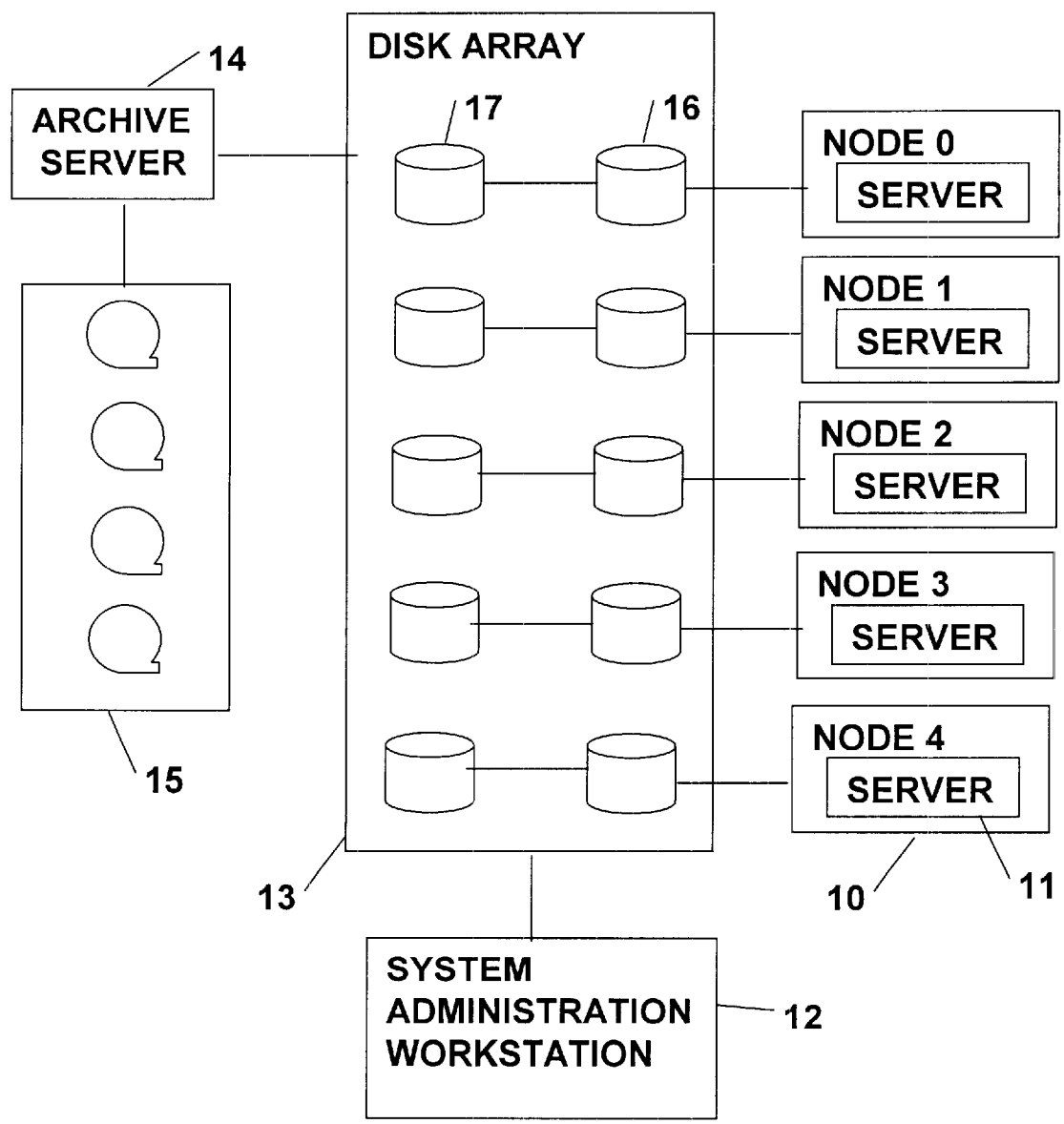
FIG. 1 is a block diagram of a multi-node computer system embodying the invention.

Referring to FIG. 1, this shows a system comprising N+1 nodes 10. In normal operation, N of the nodes are active, while the remaining one is a standby. In this example, N equals four (i.e. there are 5 nodes altogether). Each of the nodes 10 hosts a server 11.

The system also includes a system administration workstation 12, which allows a (human) operator or system administrator to monitor and control the system. Each server displays its name and current operational state on the workstation 12. One or more other systems (not shown) may also be controlled and monitored from the same workstation.

All of the nodes 10 are connected to a shared disk array 13. In this example, the disk array 13 is an EMC Symmetrix disk array. This consists of a large number of magnetic disk units, all of which are mirrored (duplexed) for resilience. In addition, the disk array includes a number of further disks, providing a Business Continuance Volume (BCV). A BCV is effectively a third plex, which can be connected to or disconnected from the primary plexes under control of EMC Timefinder software, running on the workstation 12. The BCV data can be synchronised with the primary plexes so as to provide a backup, or can be disconnected from the primary plexes, so as to provide a snapshot of the main data at a given point in time. When the BCV has been split in this way, it can be reconnected at any time and the data then copied from the primary plexes to the BCV, or vice versa, to resynchronise them.

The system also includes an archive server 14 connected to the disk array 13 and to a number of robotic magnetic tape drives 15. In operation, the archive server periodically performs an offline archive of the data in each database, by archiving the copy of the database held in the BCV to tape. When the archive is secure, the BCV is then brought back into synchronism with the main database, before again being broken away to form the recovery BCV, using the EMC TimeFinder software.

As illustrated in FIG. 1, the disk array 13 includes a number of system disks 16, one for each of the servers 11. Each system disk holds the NT operating system files and configuration files for its associated server: in other words, the system disk holds all the information that defines the "personality" of the server installation. Each of the system disks has a BCV disk 17 associated with it, holding a backup copy of the associated system disk. Normally, each BCV disk 17 is disconnected from its corresponding system disk; it is connected only if the system disk changes, so as to synchronise the two copies.

In the event of failure of one of the N active nodes 10, a recovery process is initiated on the system administration workstation 12. In this example, the recovery process comprises a script, written in the scripting language associated with the Timefinder software. The process guides the system administrator through a recovery procedure, which reconfigures the system to cause the standby node to pick up the system disk BCV of the failed node, thereby relocating the server on the failed node on to the standby node and vice versa.

The recovery process makes use of a predetermined set of device files, one for every possible combination of node and server. Since in this example there are five servers and five nodes (including the standby), there are 25 possible combinations, and hence 25 such device files are provided. Each of these files is identified by a name in the form n(N)__is__(S) where N is a node identity number, and S is the last three digits of the server name. (Other conventions could of course be used for naming the files). Each device file contains all the information required to install the specified server on the specified node.

Figure 2:
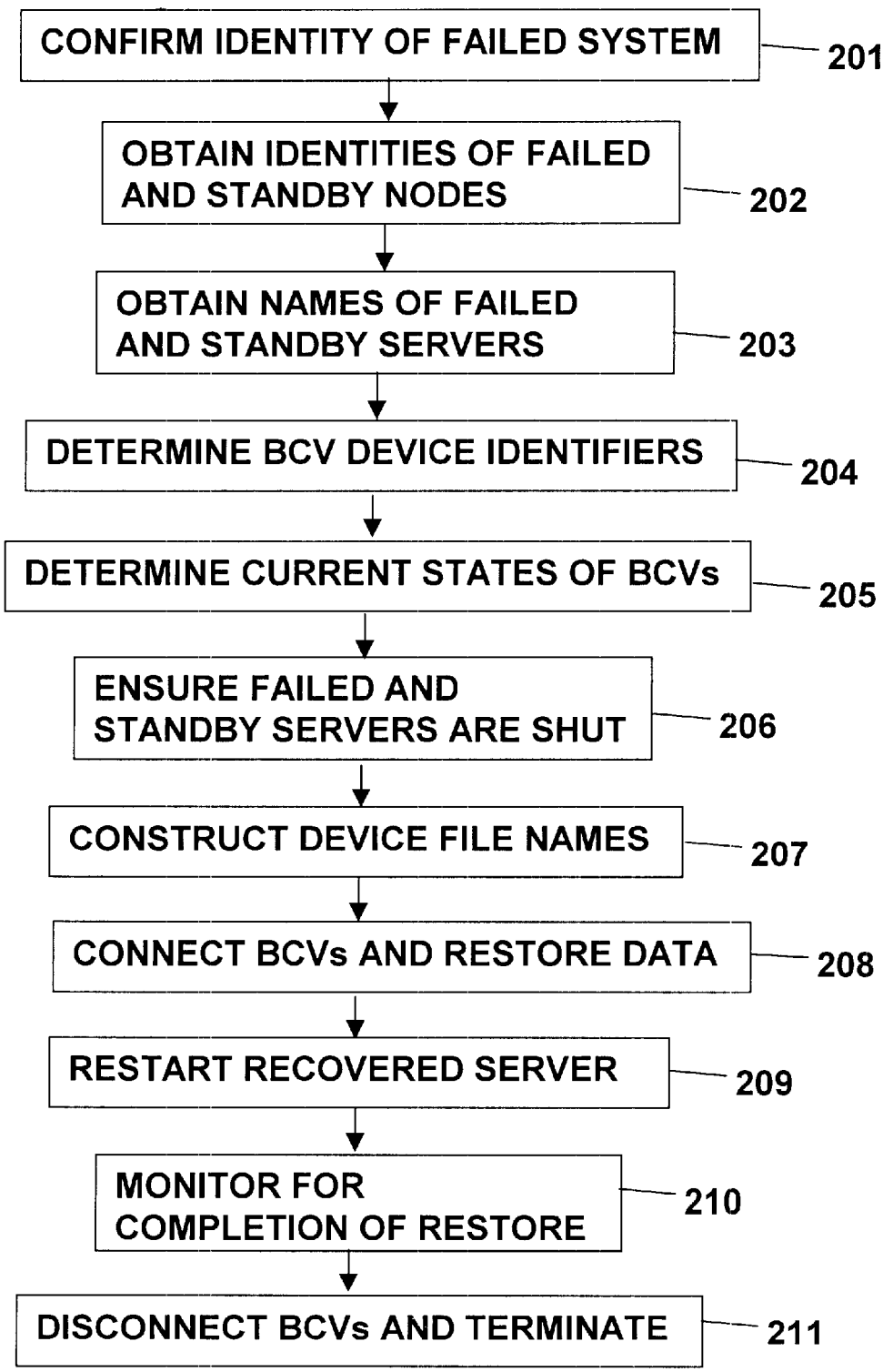
FIG. 2 is a flow chart showing a recovery process for handling failure of one of the nodes of the system.

As illustrated in FIG. 2, the recovery process comprises the following steps:

(Step 201) The recovery process first confirms the identity of the failed system with the administrator. This step is required only if more than one system is managed from the same system administration workstation.

(Step 202) The recovery process then queries the administrator to obtain the identity numbers of the failed node and the standby node. The administrator can determine these node numbers using information displayed on the system administration workstation 12.

(Step 203) The recovery process next queries the system administrator to obtain the name of the failed server (i.e. the server currently running on the failed node). The recovery process also automatically determines the name of the standby server —this is a predetermined value for each system.

(Step 204) The recovery process also automatically determines the device identifiers for the BCVs associated with the failed server and the standby server, using a lookup table which associates each server name with a particular device identifier.

(Step 205) The recovery process then calls the BCV QUERY command in the Timefinder software, so as to determine the current states of these two BCVs. These should both be in the disconnected state.

If one or both of the BCVs is not in the disconnected state, the recovery process aborts, prompting the system administrator to call the appropriate technical support service.

(Step 206) If both of the BCVs are in the disconnected state, the recovery process continues by prompting the administrator to ensure that both the failed server and the standby server are shut down. The recovery process waits for confirmation that this has been done.

(Step 207) When both the failed server and the standby server have been shut down, the recovery process constructs two device file names as follows:

The first file name is n(W)_is_(X) where W is the node number of the standby node and X is the last three digits of the failed server's name.

The second file name is n(Y)_is_(Z) where Y is the node number of the failed node and Z is the last three digits of the standby server's name.

(Step 208) The recovery process then calls the Timefinder BCV RESTORE command passing it the first device file name as a parameter. This causes the BCV of the failed node to be linked to the system disk of the standby server, and initiates copying of the data from this BCV to the system disk. It can be seen that the effect of this is to relocate the server that was running on the failed node on to the standby node.

The recovery process also calls the BCV RESTORE command, passing it the second device file name as a parameter. This causes the BCV of the standby node to be linked to the system disk of the failed server, and initiates copying of the data from this BCV to the system disk. The effect of this is therefore to relocate the server that was running on the standby node on to the failed node.

Figure 3:
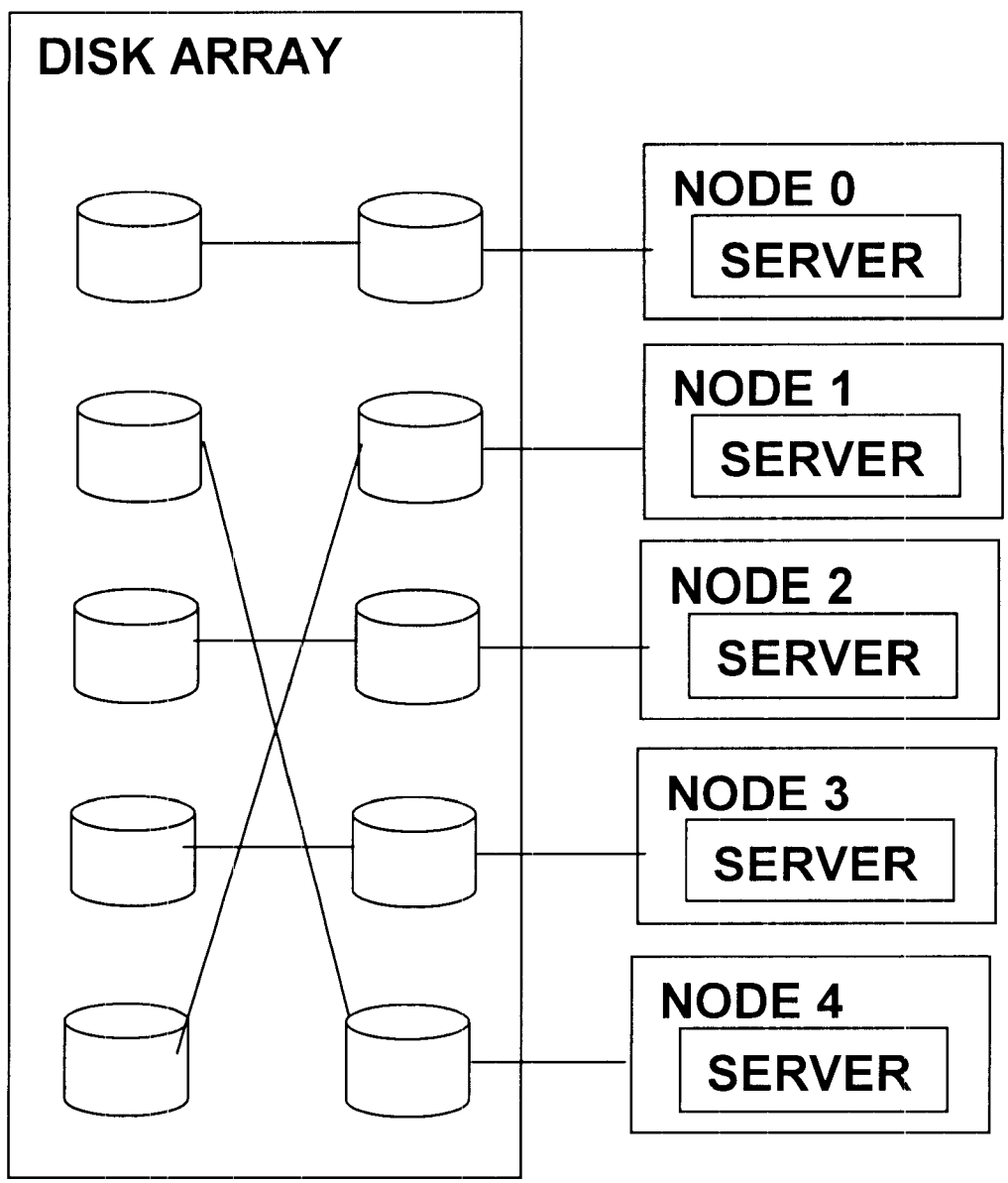
FIG. 3 is a block diagram showing an example of the system after reconfiguration by the recovery process.

As an example, FIG. 3 shows the case where node 1 has failed, and where node 4 is the standby. As shown, the BCV disk of the standby node is linked to the system disk of the failed node, and the BCV of the failed node is linked to the system disk of the standby While the restore commands are running, the recovery process checks for error responses, and reports any such responses to the administrator. It also writes all actions to a log file immediately prior to the action.

(Step 209) After issuing the restore commands, the recovery process prompts the administrator to restart the recovered server (i.e. the server which has migrated from the failed node to the standby node), stating the new node name it will run on. The standby node therefore now becomes an active node.

It should be noted that the restore commands run in the background and typically take about an hour to complete. However, the recovered server can be restarted immediately, and its data accessed, without waiting for the restore commands to complete.

(Step 210) The recovery procedure monitors for completion of the BCV restore operations, using the Timefinder BCV Query command.

(Step 211) When the restore operations are complete, the recovery procedure issues a Timefinder BCV Split command, which disconnects the BCVs from the system disks. Recovery is now complete, and the recovery process terminates.

Once the failed node has been fixed, it can be rebooted as required, and will become the standby server. The recovery procedure can then be repeated if any of the active nodes fails.

Some possible modifications

It will be appreciated that many modifications may be made to the system described above without departing from the scope of the present invention. For example, different numbers of disks and computers may be used. Also, the invention may be implemented in other operating systems, and using other hardware configurations. Moreover, instead of implementing the recovery procedure by means of a script, it could for example be integrated into the operating system.

What is claimed is:

1. A method of providing resilience in a multi-node computer system comprising a plurality of computer hardware nodes, including a plurality of active nodes and at least one standby node, the method comprising:

(a) associating at least one system disk and at least one backup disk with each of the nodes;

(b) hosting a plurality of server software installations on respective ones of the nodes, each of the server software installations being defined by information stored on a respective one of the system disks;

(c) maintaining synchronized backup copies of the system disks on respective ones of the backup disks; and (d) in the event of failure of one of the active nodes, reconfiguring the system to cause the standby node to pick up the backup disk associated with the failed node, and relocating the server software installation currently hosted on the failed node onto the standby node.

2. A method according to claim 1 wherein the step of reconfiguring the system further comprises copying of information from the backup disk associated with the failed node to the system disk associated with the standby node.

3. A method according to claim 2 further including restarting the standby computer while the copying of information is being performed in the background.

4. A method according to claim 3, including the step of maintaining a set of device files, one for each possible combination of hardware node and server software installation, wherein the step of reconfiguring the system comprises selecting two of the device files that correspond to the new configurations of the failed computer and the standby computer and using the selected device files to control reconfiguration of the system.

5. A multi-node computer system comprising:
(a) a plurality of computer hardware nodes, including a plurality of active nodes and at least one standby node;
(b) a plurality of system disks;
(c) a plurality of backup disks holding synchronized backup copies of the system disks;
(d) means for associating at least one of the system disks and at least one of the backup disks with each of the nodes;
(e) a plurality of server software installations hosted on respective ones of the nodes, the server software installations being defined by information stored on the system disks of the respective nodes; and
(f) means for reconfiguring the system in the event of failure of one of the active nodes, to cause the standby node to pick up the backup disk associated with the failed node, and relocating the server software installation currently hosted on the failed node onto the standby node.

6. A system according to claim 5, wherein the means for reconfiguring the system includes means for copying of information from the backup disk associated with the failed node to the system disk associated with the standby node.

7. A system according to claim 6 further including means for restarting the standby computer while the copying of information is being performed in the background.

8. A system according to claim 3, including a set of device files, one for each possible combination of hardware node and server software installation, wherein the means for reconfiguring the system comprises means for selecting two of the device files that correspond to the new configurations of the failed computer and the standby computer and for using the selected device files to control reconfiguration of the system.

* * * * *